United States Patent [19]

Slater et al.

[11] Patent Number: 5,474,881
[45] Date of Patent: Dec. 12, 1995

[54] SILVER HALIDE PHOTOGRAPHIC LIGHT SENSITIVE ELEMENT FOR MEDICAL RADIOGRAPHY

[75] Inventors: Sean D. Slater, Codicote; Andrew W. Mott, Bishops Stortford,, Great Britain

[73] Assignee: Minnesota Mining and Manufacturing Company, St. Paul, Minn.

[21] Appl. No.: 297,806

[22] Filed: Aug. 30, 1994

[30] Foreign Application Priority Data

Oct. 1, 1993 [GB] United Kingdom .................. 9320284

[51] Int. Cl.⁶ ..................................... G03C 1/46
[52] U.S. Cl. ...................... 430/506; 430/517; 430/522; 430/966; 430/967
[58] Field of Search .................... 430/506, 517, 430/522, 966, 967

[56] References Cited

U.S. PATENT DOCUMENTS

| | | | |
|---|---|---|---|
| 4,925,782 | 5/1990 | Okada et al. | 430/510 |
| 5,028,521 | 11/1991 | Grzeskowiak | 430/569 |

FOREIGN PATENT DOCUMENTS

0506077A1  9/1992  European Pat. Off. .

*Primary Examiner*—Charles L. Bowers, Jr.
*Assistant Examiner*—Geraldine Letscher
*Attorney, Agent, or Firm*—Gary L. Griswold; Walter N. Kirn; Mark A. Litman

[57] ABSTRACT

A medical radiographic element comprising a base bearing on each of its two major surfaces a layer of photographic silver halide emulsion sensitive to green light, said element having between the base and at least one silver halide layer a hydrophilic colloid layer containing a dye having a nucleus of the general formula:

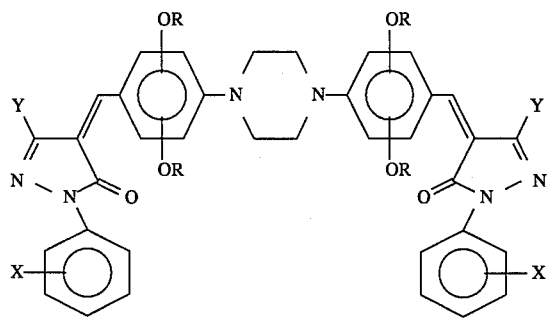

wherein:
each R independently represents an alkyl group,
each Y independently represents an electron attracting group and
each X represents a water solubilising group.

10 Claims, No Drawings

SILVER HALIDE PHOTOGRAPHIC LIGHT SENSITIVE ELEMENT FOR MEDICAL RADIOGRAPHY

FIELD OF THE INVENTION

This invention relates to a double-sided silver halide photographic element sensitive to green light for medical radiography.

BACKGROUND TO THE INVENTION

In the field of silver halide photographic light sensitive materials, it is common practice to colour photographic emulsion layers and other hydrophilic colloid layers so as to absorb light of specific wavelengths.

Medical x-ray films are often constructed with two light sensitive layers, one on either side of a transparent base. The film is imaged by phosphor screens placed on either side. It is undesirable for the light emitted from one screen to cross the base and expose the non-adjacent light sensitive layer. Such cross-over will lead to a blurred image, poor resolution and loss of image quality. This cross-over light gives the light sensitive layer an additional exposure and an apparent higher speed. The problems associated with cross-over can be eliminated by the incorporation of coloured hydrophilic colloid layers between the light sensitive layer and the base. Ideally, the dye used to colour these layers should have the following properties:

1) It should have good spectral absorption in the area of the spectrum where the phosphor screens emit (e.g., 545 nm with green screens).
2) It should be photographically inert.
3) It should be decolourised by the photographic processing solution and should not leave any undesirable colours on the material after processing.
4) It should not diffuse from the coloured layer into the other layers.
5) It should be stable in the photographic material for long periods of time before processing.

Item (4) is particularly important for medical x-ray materials since the dye-containing layer is adjacent to the light-sensitive layer. Diffusion of the dye into the light-sensitive layer can give rise to adverse effects. The coloured colloid layer must be coated at the same time as the light sensitive layer to minimise manufacturing costs. During this process, the light-sensitive photographic emulsion layer is in contact with the dye containing layer in the wet state. Diffusion of dye between these layers is very dependent on the structure of the dye.

A number of suitable dyes have been proposed in the art. Particulate dyes, mordants with dyes, and oil dispersed dyes have been used, but these present problems with simultaneous coating with the photographic emulsion layer.

U.S. Pat. No. 4,925,782 discloses dimeric merocyanine dyes for dyeing specific colloid layers in photographic light-sensitive elements. General formula (II) describes dimeric merocyanine dyes based upon N,N'-bisphenylpiperazine. None of the dyes exemplified based on this nucleus absorb green light. Of the other dyes exemplified in U.S. Pat. No. 4,925,782, none have an absorption maximum in the colloid layer close to 545 nm which is ideal for use in medical x-ray film. Exemplified dyes which absorb green light are a monomethine merocyanine (2-10) of $\lambda_{max}$ 528 nm and three trimethine merocyanines (1-49, 1-52 and 1-55) with, respectively $\lambda_{max}$ 563 nm, 575 nm and 573 nm.

Item (3) is also very important for medical x-ray films as incomplete bleaching of the dye will result in an increase in Dmin. For medical x-ray elements, the dye must be completely bleached during standard x-ray processing (90 seconds dry to dry). Dyes 1-49, 1-52 and 1-55 of U.S. Pat. No. 4,925,782 only are bleached to a residual colour of 0.01 (0.02 for double sided) following development for 3 minutes.

The dyes described in the state of the art do not satisfy all of the above mentioned 5 properties for medical x-ray films. There is a requirement for a non-diffusing dye with maximum absorption at about 545 nm that is bleached totally by photographic developer.

BRIEF SUMMARY OF THE INVENTION

According to the present invention there is provided a medical radiographic element comprising a base bearing on each major surface a layer of photographic silver halide emulsion sensitive to green light characterised in that between the base and at least one silver halide layer there is a hydrophilic colloid layer containing a dye having a nucleus of the general formula:

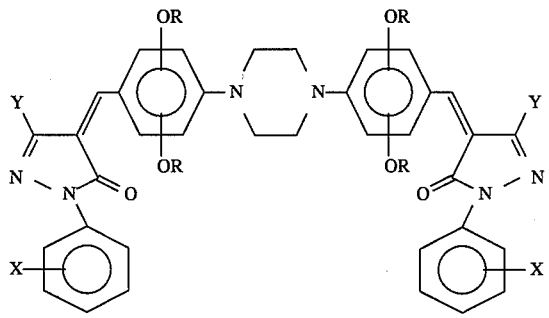

in which:
each R independently represents a substituted or unsubstituted alkyl group,
each Y independently represents an electron attracting group, and
each X represents a water solubilising group.

The invention provides a double sided silver halide light sensitive element for medical radiography having between at least one of the light sensitive layers and the base and preferably between each light sensitive layer and the base a hydrophilic colloid layer containing a dye which selectively colours this colloid layer and reduces the transmission of green light emitted from radiographic screens across the base.

The dyes used in the invention have their absorption maximum in gelatin close to the emission wavelength of medical radiographic screens, are water-soluble, yet do not diffuse into adjacent light sensitive layers or affect the photographic properties of these layers and are completely bleached during normal photographic processing. Furthermore the dyes used in the invention may be coated from a multislot coater at the same time as the silver halide layer without diffusion.

The dyes used in the invention are novel and form a further aspect of the invention.

DESCRIPTION OF PREFERRED EMBODIMENTS

In the above formula, examples of water-solubilising groups X include sulphonic acid, carboxylic acid, sulfonamide, carbonamide, phosphoric acid etc, and salts thereof.

Examples of electron attracting groups Y include aldehyde, ketone, ester, amide, sulphone, sulphonamide, nitrile, perfluoroalkyl etc.

Examples of R groups include methyl, ethyl, propyl etc, optionally bearing one or more substituents such as hydroxyl, nitrile, halogen, alkoxy, carboxyl etc.

The groups R and Y are preferably selected so as not to hinder dissolution of the dyes in aqueous media, hence those possessing low numbers of carbon atoms, e.g., up to 5 carbon atoms, and/or possessing polar substituents, such as hydroxyl or any of the groups defined by X, are preferred.

As is well understood in this technical area, a large degree of substitution is not only tolerated, but is often advisable. As a means of simplifying the discussion, the terms "nucleus", "groups" and "moiety" are used to differentiate between chemical species that allow for substitution or which may be substituted and those which do not or may not be so substituted. For example, the phrase "alkyl group" is intended to include not only pure hydrocarbon alkyl chains, such as methyl, ethyl, octyl, cyclohexyl, iso-octyl, t-butyl and the like, but also alkyl chains bearing conventional substituents known in the art, such as hydroxyl, alkoxy, phenyl, halogen (F, Cl, Br and I), cyano, nitro, amino etc. The term "nucleus" is likewise considered to allow for substitution. The phrase "alkyl moiety" on the other hand is limited to the inclusion of only pure hydrocarbon alkyl chains, such as methyl, ethyl, propyl, cyclohexyl, iso-octyl, t-butyl etc.

Conventional silver halide photographic chemistry is used in the materials of the invention.

Preferred dyes for use in the invention are those in which;

R represents a substituted or unsubstituted alkyl group having from 1 to 4 carbon atoms Y is preferably COOR, COR, $CF_3$ or CN etc., in which R is as defined above X is preferably $SO_3H$ or a salt thereof.

The following are examples of compounds represented by the general formula which are used in the present invention.

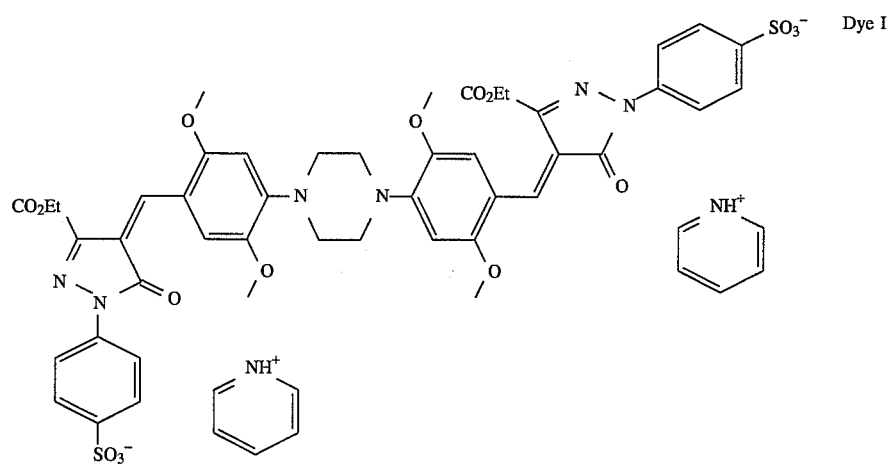

Dye I

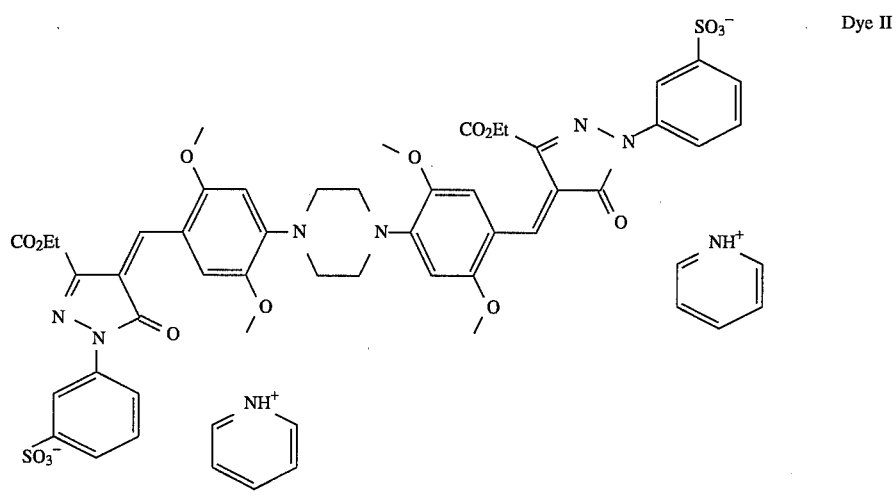

Dye II

Dyes I and II show absorption maxima in aqueous solution at 542 nm and 558 nm respectively, which shift to 530 nm and 548 nm in gelatin coatings, and therefore provide a good match with commonly used green phosphor screens. It is most unusual for merocyanine dyes with a monomethine chain to absorb at such long wavelengths; the closest analogues in the prior art with absorption in this range have a trimethine chain. The monomethines are preferable for reasons of stability, solubility in water and ease of synthesis.

It is not essential to have a dye layer on each side of the base of the radiographic element, but it is highly preferable. A single, dense layer will reduce cross-over in a comparable manner to two less dense layers, but the single layer would generally require prolonged processing in order to bleach the dye to an acceptable Dmin. The dyes are generally used in amounts providing an optical density of 0.1 to 0.5 for a layer on each side (0.2 to 1.0 overall).

Higher densities give lower cross-over, but at the expense of higher Dmin, unless longer or more vigorous processing conditions are employed.

The silver halide layers in the radiographic elements of the invention may comprise any of the photographic emulsions suitable for use in X-ray film. Preferred emulsions are laminar grain emulsions, e.g., of the type disclosed in U.S. Pat. No. 5,028,521.

The following are examples of the synthesis of compounds which are used in this invention. The following processes can be applied to the synthesis of other compounds with suitable selection of starting materials.

Synthesis of N,N'-bis(2,5-dimethoxyphenyl) piperazine 2,5-dimethoxyaniline (30.6 g) and tris(2-chloroethyl)phosphite (38.2 g) were heated together at 190° C. for 16 hours. The mixture was poured into aqueous sodium hydroxide (600 mL, 0.8M) with stirring. The solid product was collected by filtration washed with 95% ethanol and dried. The product was recrystallised from ethanol. Yield 16.2 g.

Synthesis of N,N'-bis(2,5-dimethoxy 4-formylphenyl) piperazine

Phosphoryl chloride (12.2 g) was added slowly to DMF (23.5 mL) at 0° C. A solution of the above piperazine (14.3 g) in DMF (50 mL) was added and the mixture heated to 95° C. for 2 hours. The solution was allowed to cool and poured onto ice (80 g). The pH was adjusted to 7 with aqueous sodium acetate. The solid product was collected by filtration, washed with water and dried. The product was purified by boiling with ethanol (750 mL) collecting by filtration and dried. Yield 12.2 g ir 1650 cm$^{-1}$.

Synthesis of Dye (II)

3-Ethoxycarbonyl-1-(3'sulphophenyl)-pyrazoline-5-one (1 g) and the above aldehyde (0.78 g) were refluxed together in pyridine (75 mL) for 16 hours. The product was collected by filtration, washed with a little cold ethanol and dried in vacuo. Yield 1.6 g $\lambda$max 558 nm (Ethanol/water). Dye (I) was prepared similarly using 3-ethoxycarbonyl-1-( 4'sulphophenyl)-pyrazolin-5-one. The following abbreviations and trade names are used in the Examples:

HOSTAPUR—wetting agent available from Hoechst (10% aqueous solution).

DEXTRAN 40—polysaccharide available from Fisons.

PEA—poly(ethyl acrylate) (aqueous dispersion).

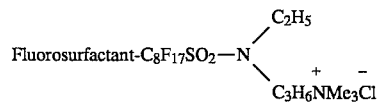

XP505—conventional X-ray film processor, available from Minnesota Mining and Manufacturing Company.

XAD2—conventional X-ray film processing chemistry, available from Minnesota Mining and Manufacturing Company.

EXAMPLE I

An underlayer solution was prepared: Dye (II) (0.75 g) was dissolved in distilled water (150 mL), filtered and added to a solution at 40° C. containing gelatin (30 g), distilled water (395 g) and 10% Hostapur (7.5 mL) as wetting agent at pH 5.8. Just prior to coating the weight of the whole was made up to 585 g and 1% aqueous vinyl sulphone hardener (15 mL) was added. A tabular silver bromide emulsion (1.4×0.17 µm) was finalised thus: To the emulsion (0.2 mol) was added gelatin (3 g), and distilled water (40 mL) after soaking and melting at 40° C., 20% aqueous resorcinol (3 mL), 0.025M azodicarbonamide (4.5 mL), 10% aqueous PEA (43 mL), was added followed by 10% aqueous Dextran 40. The pH was corrected to 6.7 and the weight to 420 g. The emulsion was then split into two parts and to each was added 1% aqueous vinyl sulphone hardener (30 mL) just prior to coating.

A topcoat solution was prepared: Distilled water (1484 g) and gelatin (100 g) were soaked and melted at 40° C. To this solution was added 1% aqueous fluorosurfactant (48 mL), 10% aqueous Hostapur and 6.5% aqueous PMMA (20 mL). The weight was corrected to 1760 g with distilled water and pH to 6.7. Just prior to coating 1% aqueous vinyl sulphone hardener (240 mL) was added.

These three solutions were triple slot coated on each side of a base with pump rates of 75, 60 and 40 mL/minute respectively with a web speed of 7.5 m/minute to give a dye coverage of 60–70 mg/m$^2$ and a silver coating weight of 2.0 g/m$^2$ each side. The overall dye density was 0.3. $\lambda_{max}$ 548 nm.

Film was exposed via a double-sided sensitometer through either two Wratten 98 (W98/blue) or two Wratten 99 (W99/green) filters; 0–4 continuous wedge, 0.1 sec. X-ray exposure was via a Trimax T8 screen, 80 kV, 25 mA, 0.1 sec aluminium 0–2 step wedge.

Film samples were processed in an XP505 processor using a XAD2 commercial photographic developing solution (3M) 90 seconds dry to dry.

X-ray cross-over was measured: The film was given a normal x-ray screen exposure but with half the bottom screen obscured such that one half of the film received a single sided exposure and the other half received a normal double exposure. An exposure of 80 KV 25mA 0.1 sec was used. Exposed and processed samples then had the side that was lowermost on exposure removed using a sodium hypochlorite solution. The samples were then cut into two strips one of which represented the single sided exposure and the other the double sided exposure. Speed values were obtained at points 0.45 and 1.20 actual density. A speed difference was then obtained between the single and double sided exposure. % cross-over was then calculated as follows:

$$\% \text{ cross-over} = (10^{\text{speed difference}} - 1.0)(10^{-\text{speed difference}})(100)$$

Results obtained from Example 1 together with a comparison film identical to Example 1 but without the dye underlayers and a commercial medical x-ray film (XD/A film commercially available from 3M) are shown in Table 1.

TABLE 1

| | Dmin | Sp-G | Sp-B | Sp-X | Con-X | Dmax | Cross-over |
|---|---|---|---|---|---|---|---|
| Example 1 | 0.22 | 1.97 | 0.85 | 1.38 | 2.32 | 3.74 | 14% |
| Comparison | 0.22 | 2.08 | 0.97 | 1.42 | 2.27 | 3.71 | 26% |
| XD/A | 0.22 | 1.92 | 1.02 | 1.28 | 2.10 | 3.37 | 38% |

Sp-G, Sp-B and Sp-X are speeds to green light, blue light and x-rays respectively. Con-X is contrast to x-rays. % cross-over is the average between the values obtained at 0.45 and 1.20 densities.

It has been seen that the dye underlayer reduces substantially the cross-over between two light sensitized layers without affecting photographic properties of speed, contrast, Dmax and Dmin. The maintaining of photographic properties indicates that the dye (II) remained in the dye underlayer even during triple slot coating.

To demonstrate the improvement in image quality of medical x-ray films of this invention, Modulation Transfer Function (MTF) curves were plotted for Example 1 and the comparison films. X-ray MTF was obtained using a lead Sayce chart resulting in a square wave "transfer function" as described in "Imaging Science" J. C. Dainty and R. Shaw. Academic Press (1974) p 243.

The improvement in resolution of the film of this invention was clearly demonstrated from these curves. For example, at an MTF value of 0.75 the film of this invention (Example 1) had a resolution of 1.0 lines/mm compared to 0.6 lines/mm without the underlayer and 0.7 lines/mm for the commercial film.

EXAMPLE 2

The same procedure was adopted as in Example 1 except that 200 mL of the 0.5% solution of Dye (II) was used in the underlayer solution. The amount of hardener in the topcoat solution was also increased to 300 ml of 1% aqueous vinyl sulphone. The results for sensitometry and cross-over for Example 2 and a comparison sample without dye underlayer are shown in Table 2.

TABLE 2

|  | Dmin | Sp-G | Sp-B | Sp-X | Con-X | Dmax | Cross-cover |
| --- | --- | --- | --- | --- | --- | --- | --- |
| Example 2 | 0.22 | 1.87 | 0.76 | 1.20 | 2.16 | 3.35 | 16% |
| Comparison | 0.22 | 2.03 | 0.96 | 1.40 | 2.26 | 3.63 | 28% |

X-ray MTF was obtained for each sample as follows: The film was given a normal wedge exposure but with the addition of a lead target placed in the x-ray cassette above the top screen. An exposure of 80 kV 25 mA for 0.1 seconds was used in conjunction with a Trimax T8 screen. Exposed and processed films were then measured on a Joyce-Loebel series VI micro-densitometer linked to a PDP 11 computer. The MTF was derived by scanning across the generated edge, converting the density variations into exposure changes via a DlogE curve and then Fourier transforming the data. This Spread Function Method for determining MTF is as described in "Imaging Science" J. C. Dainty and R. Shaw. Academic Press (1974) p. 244.

The MTF curves demonstrated the improvement in the quality of the film of the invention. At an MTF value of 0.75, Example 2 had a resolution of 0.65 lines/mm compared to 0.51 lines/mm without the dye underlayer.

EXAMPLE 3

An underlayer solution prepared from: gelatin (46 g), distilled water (775 mL), 0.5% Dye II (150 mL), 10% aqueous Hostapur (12 mL) at a pH of 5.8 and adjusted to 985 g. 1% aqueous vinyl sulphone hardener (15 mL) was added just prior to coating.

The silver bromide emulsion was a slightly thicker (1.2× 0.24 μm) tabular grained emulsion than Examples 1 and 2. The silver coating weight was 3.9 g/m².

The amount of 1% aqueous vinyl sulphone hardener used in the topcoat and emulsion solutions was reduced to 150 mL and 15 mL, respectively, resulting in a softer film.

The results for sensitometry and cross-over for Example 3, a comparison film without the dye underlayers and another commercially available film, XD/A+ are shown in Table 3.

TABLE 3

|  | Dmin | Sp-G | Sp-B | Sp-X | Con-X | Dmax | Cross-cover |
| --- | --- | --- | --- | --- | --- | --- | --- |
| Example 3 | 0.24 | 2.01 | 0.94 | 1.39 | 2.20 | 4.19 | 16% |
| Comparison | 0.24 | 2.12 | 0.93 | 1.46 | 2.22 | 4.11 | 26% |
| XD/A+ | 0.24 | 2.09 | 0.97 | 1.42 | 2.14 | 3.66 | 26% |

MTF curves obtained by the method described in Example 2 demonstrated improved resolution of the film of the invention over the other samples.

EXAMPLE 4

An underlayer solution was prepared from gelatin (30 g), distilled water (405 g), 0.5% Dye II solution (200 mL), 10% aqueous Hostapur (7.5 mL) at a pH of 5.8. The weight was adjusted to 645 g with distilled water and a 1% vinyl sulphone hardener solution (15 mL) was added prior to coating.

The emulsion and top coat solutions were as in Example 3.

The sensitometry and cross-over results for Example 4 together with a comparison film with no dye underlayer and another commercial film (S-HRG, Fuji) that uses an unknown dye underlayer system to achieve low cross-over are shown in Table 4.

TABLE 4

|  | Dmin | Sp-G | Sp-B | Sp-X | Con-X | Dmax | Cross-cover |
| --- | --- | --- | --- | --- | --- | --- | --- |
| Example 4 | 0.27 | 1.99 | 0.90 | 1.40 | 2.08 | 3.83 | 12% |
| Comparison | 0.24 | 2.11 | 0.95 | 1.51 | 2.11 | 3.65 | 26% |
| S-HRG | 0.24 | 2.06 | 0.99 | 1.42 | 2.13 | 3.60 | 17% |

The sample of this invention achieved lower cross-over than the S-HRG film resulting in improved performance as demonstrated by MTF curves obtained by the method described in Example 2. The high dye loading of Example 4 does result in some unbleached dye after a 90 second processing cycle. The residual colour from both dye layers combines to increase the Dmin by 0.03.

We claim:

1. A medical radiographic element comprising a base having two major surfaces, said element bearing on each of its two major surfaces a layer of photographic silver halide emulsion sensitive to green light so that a first major surface has thereon a first silver halide emulsion layer sensitive to green light and a second major surface has thereon a second silver halide emulsion layer sensitive to green light, said element having between the base and at least one of said first and second silver halide emulsion layer a hydrophilic colloid layer containing a dye having a nucleus of the general formula:

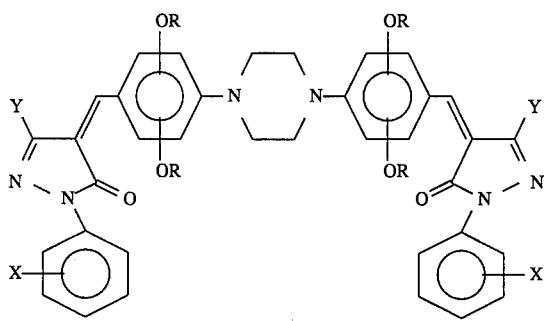

wherein:
  each R independently represents an alkyl group,
  each Y independently represents an electron attracting group and
  each X represents a water solubilizing group.

2. A medical radiographic element according to claim 1 wherein R represents an alkyl group of from 1 to 4 carbon atoms.

3. A medical radiographic element according to claim 1 wherein Y is a member selected from the group consisting of COOR, COR, $CF_3$ and CN wherein R represents an alkyl group of 1 to 4 carbon atoms.

4. A medical radiographic element according to claim 1 wherein X is $SO_3H$ or a salt thereof.

5. A medical radiographic element according to claim 1 wherein the dye is selected from the group consisting of:

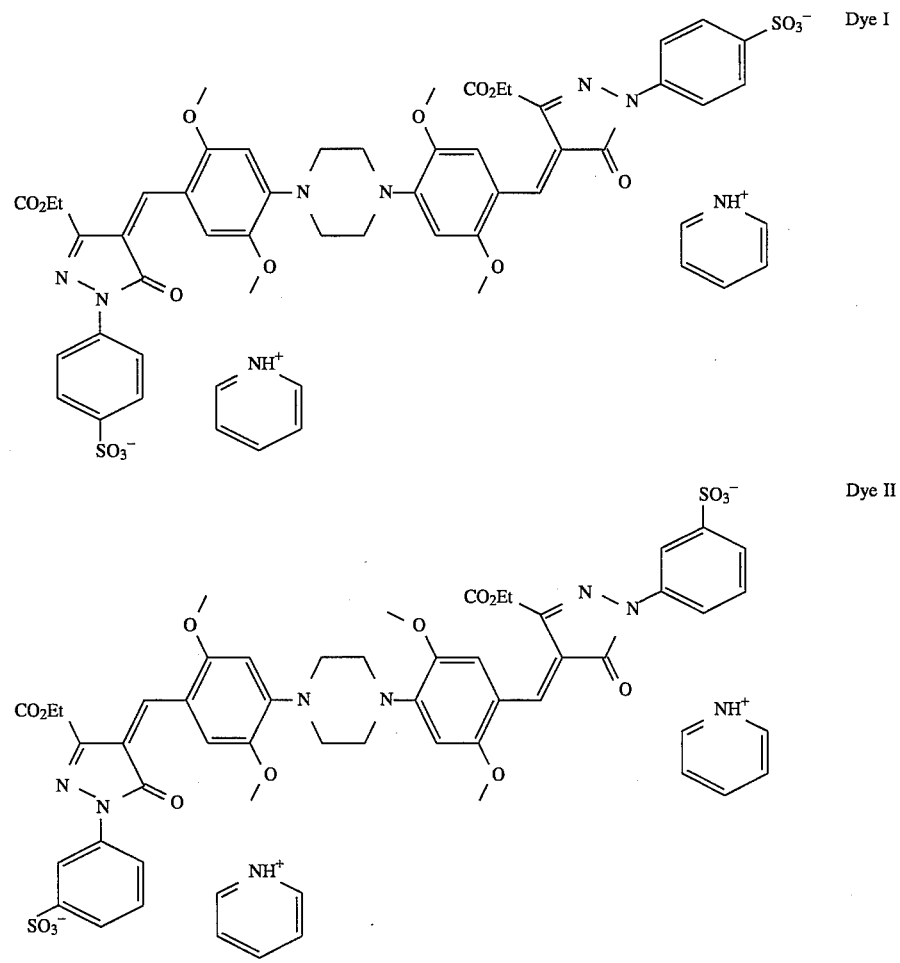

6. A medical radiographic element according to claim 1 wherein said dye is present in an amount to provide an optical density to green light of about 0.3 in said dye layer.

7. A medical radiographic element according to claim 1 wherein said silver halide emulsion is a tabular grain emulsion.

8. A method of preparing a medical radiographic element in which a layer of photographic silver halide emulsion sensitive to green light is coated on each side of a base and on at least one side of said base a hydrophilic colloid layer is coated between said base and silver halide emulsion containing a dye having a nucleus of the general formula:

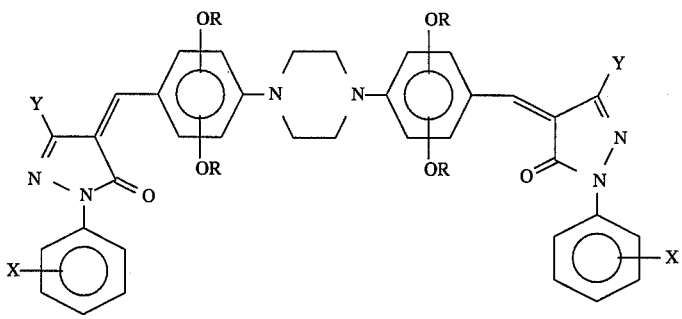

in which:

each R independently represents an alkyl group, each Y independently represents an electron attracting group and each X represents a water solubilising group, is coated on the base between the base and at least one silver halide layer.

9. A method of preparing a medical radiographic element according to claim 8 wherein the dye is a selected from the groups consisting of:

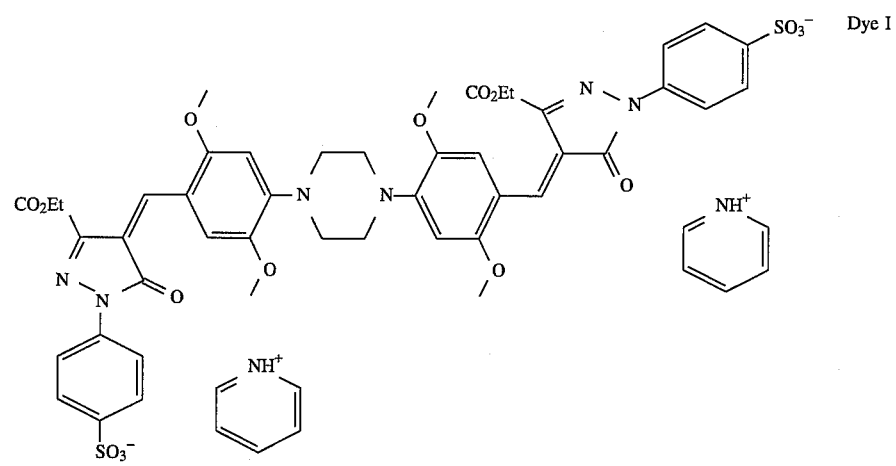

-continued
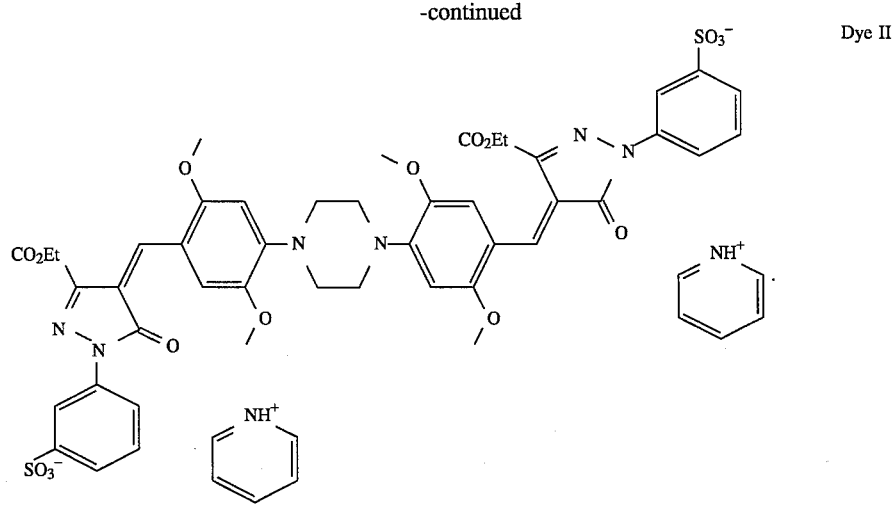
Dye II
10. A method of preparing a medical radiographic element according to claim 9 wherein said hydrophilic colloid layer containing a dye is applied simultaneously with a silver halide layer from a multislot coater.
* * * * *